Jan. 30, 1962 L. B. EDWARDS, JR Re. 25,117

STORAGE RACK

Original Filed Aug. 16, 1957 3 Sheets-Sheet 1

INVENTOR
LANDON B EDWARDS Jr.

BY
ATTORNEY

STORAGE RACK

Original Filed Aug. 16, 1957 3 Sheets-Sheet 2

INVENTOR

LANDON B. EDWARDS Jr.

ATTORNEY

STORAGE RACK

Original Filed Aug. 16, 1957 3 Sheets-Sheet 3

INVENTOR
LANDON B. EDWARDS Jr.

BY

ATTORNEY

United States Patent Office

Re. 25,117
Reissued Jan. 30, 1962

25,117
STORAGE RACK

Landon B. Edwards, Jr., 1018 Ridge Top Road, Richmond, Va.

Original No. 2,894,641, dated July 14, 1959, Ser. No. 678,632, Aug. 16, 1957. Application for reissue June 19, 1961, Ser. No. 125,894
8 Claims. (Cl. 211—134)

Matter enclosed in heavy brackets [ ] appears in the original patent but forms no part of this reissue specification; matter printed in italics indicates the additions made by reissue.

This invention relates to racks for storing merchandise.

One of the objects of the invention is to provide a system of frames including horizontal elements and vertical supports which lend themselves to embodiment in various ventilation and inspection arrangements to provide storage racks for drying tobacco; storage of barrels or hogsheads; *pallets or crates; suspension supports, and the like;* or where space is a problem in storing other merchandise, to be so assembled as to effect more closely spaced frames to meet the demands of a larger volume of storage space.

Another object of the invention is to provide a storage rack including frames spaced to provide unobstructed aisleways for admitting a lift truck and permitting storage of articles to be supported and freely removed without hindrance from the framework. Each of the frames comprises elements forming load carrying columns *or posts* intended to support horizontally disposed rails projecting [inwardly] *outwardly* from opposite columns *or posts* thereby to provide footings *or supports,* at selected elevations, for pallets, hogsheads, crates, boxes or the like; and which, in all of these adaptations, provides an unrestricted aisleway for truck entry from one or both ends, depending on whether [or not] one end faces a wall or stands in the clear like the other.

A further object of the invention is to provide a rack of great flexibility in use and which includes structural shapes which readily lend themselves to simple manufacturing procedures, and which may be assembled from stock to provide aisleways of any desired width.

With the above and other objects in view which will more readily appear as the nature of the invention is better understood, the same consists in the novel construction, combination, and arrangement of parts hereinafter more fully described, illustrated and claimed.

A preferred and practical embodiment of the invention is shown in the accompanying drawings, in which.

Similar reference characters designate corresponding parts throughout the several figures of the drawing.

Figure 1:
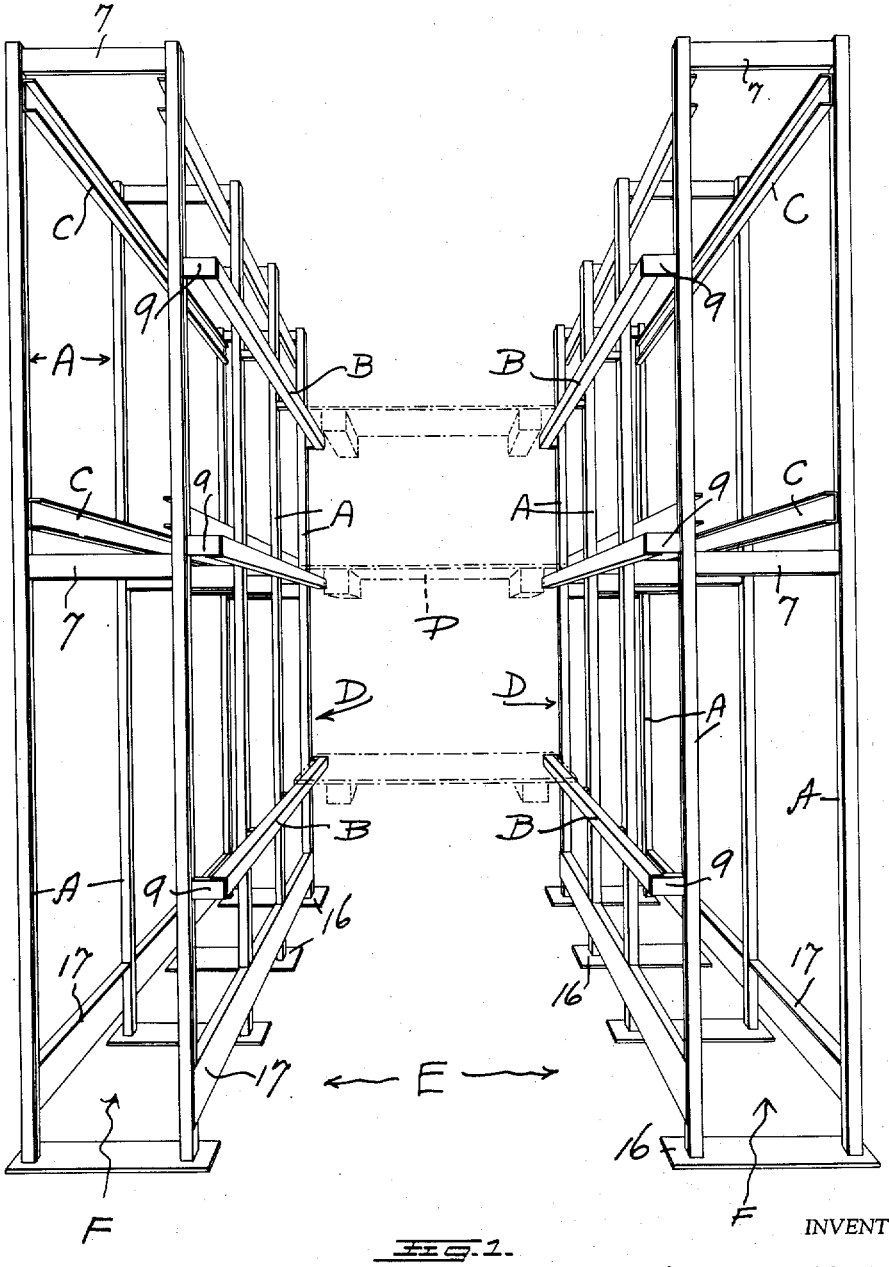
FIG. 1 is a perspective view of a rack including frames spaced to provide merchandise storage aisleways and inspection corridors.

Referring to FIG. 1, it will be observed that the invention includes in its organization upright [supports or columns] *supporting columns or posts* A and laterally offset but longitudinally disposed *load supporting* rails B, said rails projecting toward each other from opposite frames, and the *upright supporting columns or posts* [supports] being connected by the horizontal braces C. The elements are assembled in at least a pair of cooperatively related frames designated generally as D and spaced to provide an aisleway E therebetween.

*It will be further noted that each frame member D, as illustrated in FIG. 1, consists of a pair of parallel spaced panel-like members spaced apart and rigidly connected by transverse spacing members 7, thus providing a ventilating and inspection corridor F therebetween.*

Figure 2:
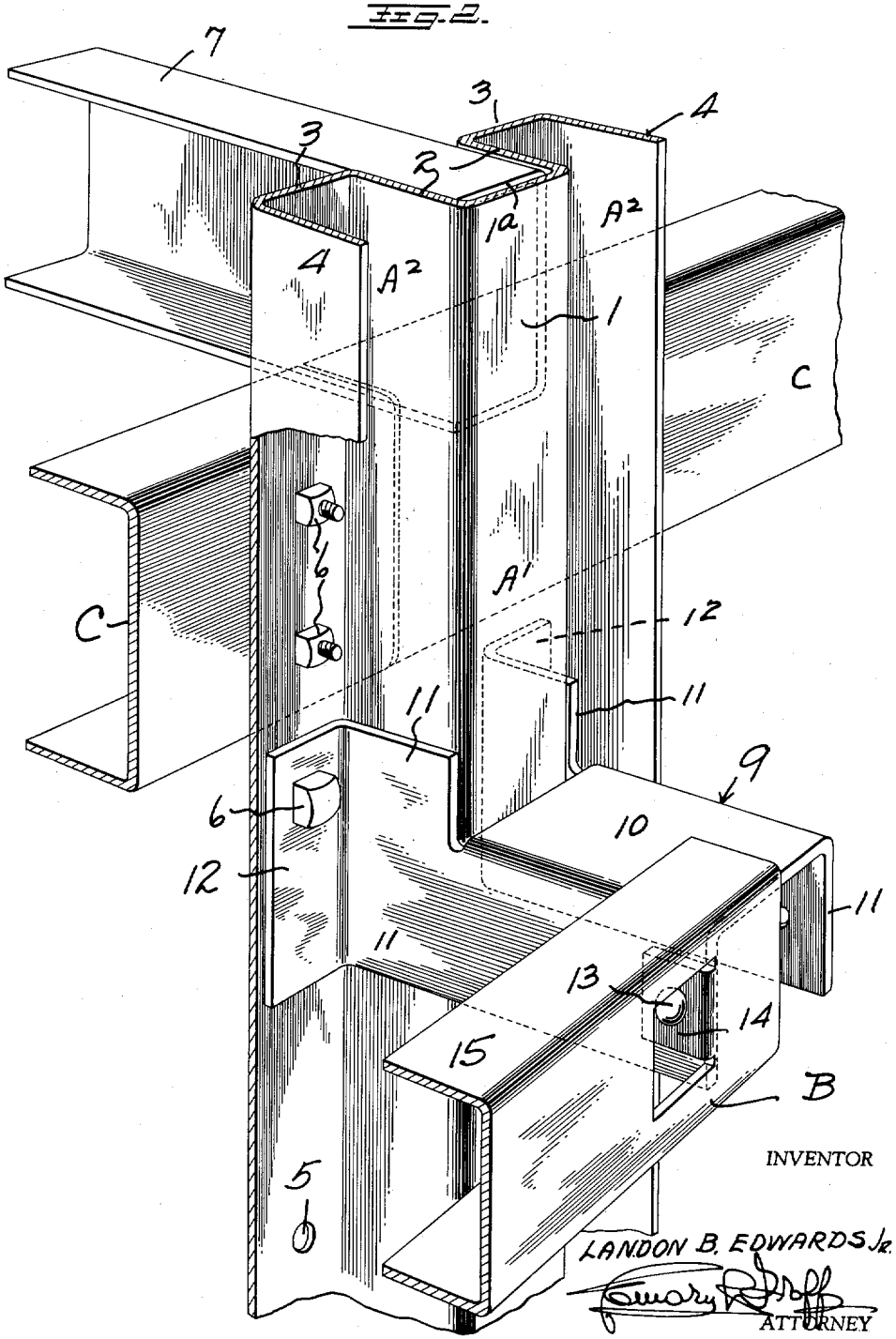
FIG. 2 is an enlarged detail perspective view of the structural elements providing the load carrying columns *or posts,* horizontal braces, rail supporting brackets and rails.

The columns *or posts* A are of special formation in the respect that their cross sectional shape is such as to provide a medial channel and socket forming portion A′, *FIG. 2* [(FIG. 2)] flanked on each side by reversely related fastening receiving channel portions $A^2$.

The medial channel portion A′ includes a bottom wall or web 1, and side walls 2—2 connected with the bottom walls or webs 3—3 of the outer fastening receiving channel portions $A^2$, the latter having the outer walls 4—4. The outer side of the web of the medial channel faces the aisleway E.

The webs 3—3 of the outer channel portions $A^2$ are provided with a plurality of vertically spaced openings 5, which, as will presently appear, are intended to receive fastenings 6.

The walls 2—2 of the channel A′, in conjunction with the web 1 provide, in effect, at their outer *sides* [side], a continuous vertical socket portion $1^a$ for receiving an end of spacer members 7 when the supports A are to be spaced apart *transversely,* as shown in FIGURES 1 and 2, thereby to provide *an elongated corridor or* air circulating space, as well as an inspection corridor *or walkway* F where a man can enter, as for example, in the event that the structure is used for tobacco drying, or storing hogsheads or other merchandise where free air circulation and inspection are required.

The supports A are held together by the aforesaid horizontally disposed braces C to form the *panel-like members of the respective* frames by the said fastenings 6 connecting the channel shaped braces with the *upright* columns *A.* It will [, of course,] be seen that the horizontally and longitudinally disposed braces C are not at the same elevation as the members 7 for spacing the upright columns, so that the opposite ends of the [latter] *spacers 7* will readily fit in the sockets $1^a$ of the medial channel portion of each *transversely aligned* pair of upright columns A to hold them in position to provide the ventilation or inspection corridor previously referred to. The [spaced] *spacing* members 7 have their opposite end portions welded into the walls 2—2 of the socket [channel] *channels.*

As will be seen more in detail from FIG. 2, the brackets 9 include a horizontal web portion 10 and rearwardly extending downturned flanges 11 whose inner ends straddle the channel A′ and terminate in the angular attaching feet 12 disposed in the related [valley] *valleys* of the outer fastening receiving channel portions $A^2$. These feet are provided with openings for registry with the openings 5, so that the fastenings 6 will connect the feet 12 with the uprights while at the same time *others connect* [connecting] the longitudinal channel braces C with the uprights *in off-set relation to said brackets.*

The outer portions of the flanges of the brackets 9 are also provided with openings to receive the fastenings 13 which connect the angularly disposed ears 14 of adjacent sections 15 of the rail B with the outer ends of the brackets.

The rails B are made of sections of transversely U-shaped or channel formation and near the ends thereof, as will be apparent from FIG. 2, the aforesaid ears 14 are punched inwardly from the web of the channel and are provided with holes to receive the fastenings 13 to rigidly secure the rails to the appropriate bracket 9. The length of the brackets 9, that is, the distance which the web 10 and flanges 11 project outwardly of the vertical supports A, may be lengthened as desired to provide adequate bearing support for some types of containers in the aisleway between the frames D. For example, as some barrels that have end portions needing more support at each end than others.

*At this point it may be well to elucidate the cooperative relationship of the opposite rails in any pair of opposed frame members D by explicitly stating that these oppositely disposed rails facing each other at the same level are spaced at such predetermined distance apart as to receive and support opposite ends or edges of pallets, hogsheads, crates of merchandise, or other supports for articles in suspension across the adjacent aisleway at levels above the material handling truck.*

As shown in FIGS. 1 and 2, the upright supports A are assembled in spaced corridors-forming relation by the spacing members 7, and the lower ends of the uprights A—A rest upon and are welded to suitable base plates 16 anchored to the floor. The lower portion of the uprights may be provided with a strip 17 which *serves* [acts] as a rub-rail or scuff strip and tends to aid in keeping pallets P, or the like, properly *aligned* [alined] within the bottom of the aisleway E formed between the opposite frames D. The rub-rails are preferably constructed of angle shaped members 17 with a top flange 19 which is notched out as at 20 to fit flat against one side of the uprights A. The ends of the vertical flange portions are provided with openings which cooperate with similar openings in the medial channel A′ to receive suitable fastenings 21.

Figure 4:
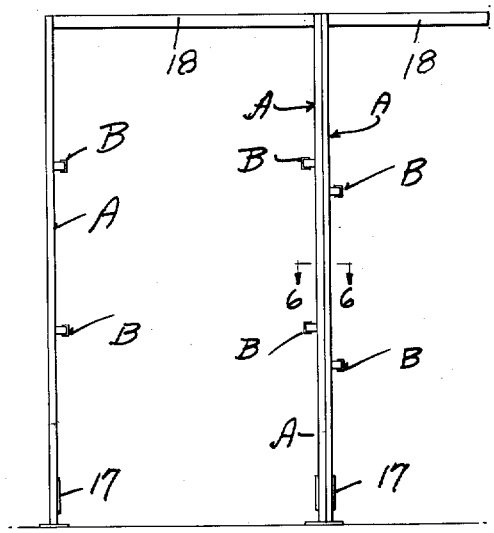
FIG. 4 is a detail front elevation of a frame, omitting the spacing elements forming the inspection corridors.
Figure 5:
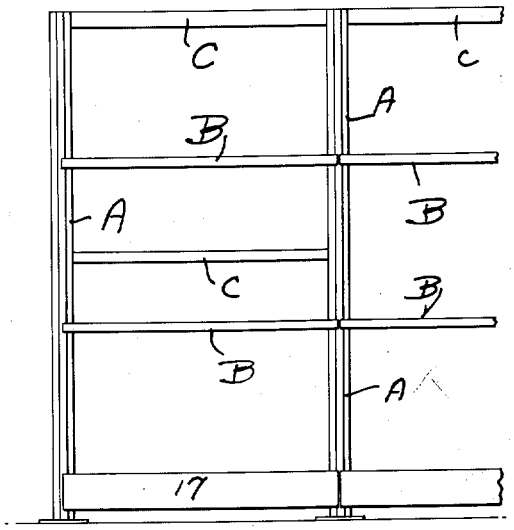
FIG. 5 is a detail side elevation of the arrangement shown in FIG. 4.
Figure 6:
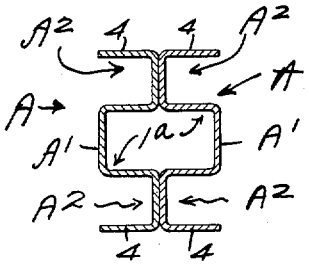
FIG. 6 is [a] *an enlarged* detail cross-section taken on the line 6—6 of FIG. 4.

In some situations where space is at a premium, and it is not necessary to provide a ventilation or inspection corridor, the vertical supports A of the frames may have the bottom portions or webs 3 of their outer fastening-receiving channels disposed in abutting relation as shown in FIGS. 4, 5 and 6, *in which assembly* [which, of course, means that] the spacing members 7 are *obviously* omitted.

Figure 3:
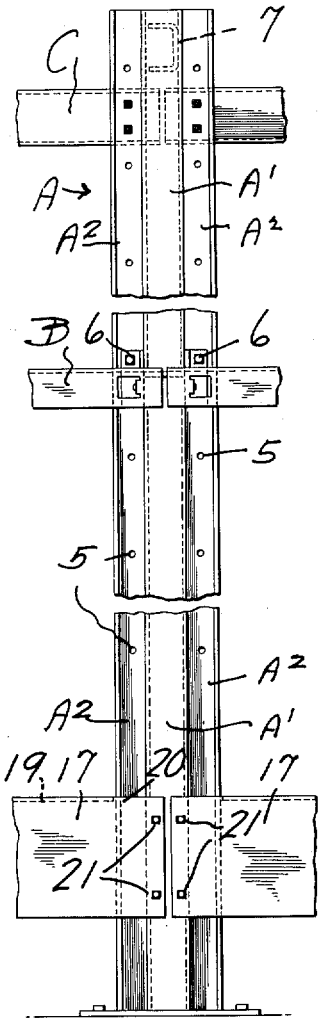
FIG. 3 is [a] *an enlarged* detail elevation of one of the columns *or posts* and associated elements shown in FIGS. 1 and 2.

The openings 5 in the webs 3 of the outer fastening channels $A^2$ may receive bolts for securing mating upright columns in abutting relation, [and, of course, it will be] *it being* understood that the columns are held in desired longitudinal spaced relation by the longitudinal braces C *as in FIGS. 1–3.* [Also, it will] *It will also* be understood that the said columns A in this arrangement support the brackets 9 to secure the sections 15 of the rails B in place. In this form of the invention[,] the uprights A are preferably secured together at their top edges by the connecting strips 18, and likewise the bottom or foot portions of the vertical members *A* may be secured to the floor by suitable *anchoring* plates, *as disclosed in the preferred form illustrated in FIG. 1.*

*Although mention is made of using bolts as a means for fastening or securing uprights back to back as in the above instance, it is not intended so to limit the assembly to such means, because it is common to use rivets or spot welding in the assembly of structural elements. As a matter of practical procedure where the spacing members are not used, it would be quite feasible to have the pairs of uprights A—A spot welded at the factory and this*

*would greatly simplify the assembly after shipment. On the other hand, it would not be so convenient to ship the assembled frames D as in FIG. 1, with the horizontal braces C and spacing members 7 assembled with the uprights A for obvious reasons of bulk. Similarly, it would be more practical to assemble the brackets and rails B at the site where used. The advantage in using bolts instead of rivets or welding is in the ready disassembly to move from one location to another.*

*While the disclosure illustrates but two extreme situations wherein spacers 7 may be used of such length as to provide a walkway and inspection corridor F through each frame member D, as shown in FIG. 1; or, as illustrated in FIGS. 4, 5 and 6, wherein the spacers 7 are omitted and the uprights A—A are directly joined by fasteners, entirely failing to provide any ventilation or inspection corridor through the frame member; it may well be that in actual practice, where the conservation of space is deemed of greater importance than the wide inspection corridor, and yet where a ventilating space is considered of prime importance within frames, it will be found that by using spacing members 7 of relatively short length such desired ventilating spaces may thus be provided while at the same time maintaining the same ruggedness and stability in the assembled frame D. Moreover, frames adjacent walls need but one supporting rail on the side adjacent the aisleway, while the other side may be connected by braces or short spacers to a wall structure. In this last instance, even but a single row of upright supports may be sufficient.*

*In view of the foregoing considerations relative to various optional details in the construction and assembly of the structure, I desire to be limited only by the scope of the appended claims.*

I claim:

1. In a merchandise storage rack assembly, a pair *or more* of skeleton frame [elements] *members* laterally spaced apart from each other and cooperating to provide an open ended aisleway *between each pair* [therebetween], each of said frame *members* [elements] including, *a double row of longitudinally spaced upright supports* [upright supports spaced longitudinally of said frame elements and each], *each support* of a cross-sectional shape *providing* [to provide] a medial channel having a bottom wall facing *an adjacent* [said] aisleway, inner side walls connected with said bottom wall and projecting *inwardly* at right angles thereto, webs connected at right angles to said inner side walls and provided with vertically spaced openings, an outer wall depending from each of said webs, said inner side walls, webs and outer walls forming fastening receiving channel portions reversely disposed to said medial channel, channel shaped braces disposed *longitudinally* [transversely] of the upright supports and having openings registering with *certain of* said openings in the webs of the uprights to receive fastenings therethrough to rigidly secure the braces to said upright supports, channel shaped brackets each comprising a horizontal web portion, vertical side flanges depending from said web portion and extending beyond one edge thereof to embrace said medial channel of [the] said upright supports, angularly disposed feet connected to said flanges and provided with openings registering with *other* said openings in the upright supports to receive fastenings therethrough and rigidly support said brackets to the aisle side of the uprights, and supporting rails carried by the aisle ends of the brackets, said rails comprising channel shaped members having angularly disposed ears positioned to engage with the side flanges of the brackets, [and] means for securing said ears to *said flanges, and spacing members disposed transversely between said double row of upright supports rigidly secured at opposite ends in said medial channels of oppositely disposed pairs of said uprights.*

2. In a merchandising storage rack assembly, a pair of skeleton frame [elements] *members* laterally spaced apart from each other and cooperating to provide an open-ended aisleway therebetween, each of said frame [elements] *members* including a series of upright supports spaced longitudinally of said frame [elements] *members* and of a cross-sectional shape to provide a medial channel having a bottom wall whose outer face is disposed toward said aisleway, and whose side walls connect with said bottom wall and project at right angles thereto, webs connected to the terminal portions of said side walls and disposed at right angles thereto, inverted channel shaped brackets each comprising a horizontal web portion and vertical depending side flanges having portions adjacent the side walls of the upright to embrace the same, and foot portions disposed at right angles to said depending side walls and secured to the webs of the [uprights] *upright supports,* [and] load carrying channel shaped supporting rails telescopically fitting over the aisle [end] *ends* of the [bracket] *brackets* and rigidly secured thereto, *and channel shaped braces disposed longitudinally of said upright supports in vertically spaced, off-set relation to said brackets and rigidly secured to the webs of the upright supports.*

3. A merchandise storage rack assembly, comprising, [a pair] *multiple pairs* of skeleton frame [elements] *members arranged in parallel and* laterally spaced apart to cooperate in providing open ended storage aisleways therebetween which permit unobstructed entry and exit of fork-lift trucks or like materials-handling equipment, said frame [elements] *members each* including *a double row of longitudinally spaced* upright supports, *the rows of uprights being spaced laterally with corresponding opposite pairs rigidly connected by spacer elements secured to said opposite pairs of said uprights, said upright supports being* of a cross-sectional shape to provide a medial channel having a bottom wall facing said storage aisleways, inner side walls connected with said bottom wall and projecting at right angles thereto, webs connected at right angles to said inner walls and provided with vertically spaced openings, an outer wall depending from each of said webs, said inner side walls, webs and outer walls forming fastening receiving channel portions reversely disposed to said medial channel, channel shaped braces disposed [transversely] *longitudinally* of the upright supports and having openings registering with said openings in the webs of the uprights to receive fastenings therethrough to rigidly secure the braces to said upright supports, channel shaped brackets each comprising a horizontal web portion, vertical side flanges depending from said web portion and extending beyond one edge thereof to embrace said medial channel of said upright supports, angularly disposed feet connected to said flanges and provided with openings registering with *other* said openings in the upright supports to [receiving] *receive* fastenings therethrough and rigidly support said brackets to the storage aisle side of the uprights, supporting [sails] *rails* carried by the aisle ends of the brackets, said rails comprising channel shaped members having angularly disposed ears positioned to engage with the said flanges of the brackets and means for securing said ears to said flanges, and angle shaped rub-rails with top flange notched out to fit flat against upright supports *on the aisle faces near the lower ends thereof* and having openings in the vertical flange registering with openings in the medial channel of the upright supports to receive fastenings therethrough to rigidly secure the rub-rails to said upright supports.

*4. A merchandise storage rack assembly, comprising: a plurality of skeleton frame members consisting of structural metallic elements, said frame members arranged substantially in pairs or multiple pairs when assembled for use, the pairs being arranged in substantially parallel rows spaced from each other at such predetermined distance as to provide an open, unobstructed aisleway between opposite pairs for entry and unloading of a fork-lift truck or other type of material handling equipment, the elements of each frame member comprising a pair of similarly constructed panel-like elements, each such panel comprising a plurality of longitudinally spaced upright supporting posts or columns rigidly attached to base plates provided with means for rigidly securing same to a floor, said panels being spaced laterally at an optional distance to form parallel rows, each row of posts or columns being connected by a plurality of vertically spaced horizontal bracing members extending longitudinally of the row of posts, and rigidly secured thereto by fastening means, such as bolts or the like; arm brackets rigidly secured to each post at vertically spaced intervals and protruding horizontally and laterally therefrom and extending for a limited distance over the edge of the adjacent aisleway, a plurality of load-supporting rails horizontally arranged in longitudinal relation with each row of posts and rigidly attached to the protruding brackets by fasteners, such as bolts or the like, the load-supporting rails on each side of the frame members overhanging the sides of their adjacent aisleways, the rails on opposite sides of each aisleway being adapted for mutual cooperation to support opposite ends of hogsheads, pallets, crates, and the like containing merchandise deposited thereon by said material handling equipment, and spacing members of optional length and number disposed transversely between opposite pairs of posts within each frame member and rigidly secured at each end, as by spot welding, to said opposite posts, said construction thus forming an open ventilating space of optional width longitudinally of each frame memway within each frame member for inspection and inventory purposes.*

*5. The structure set forth in claim 4, and also including: rub-rails or scuff strips extending longitudinally of said frames on opposite sides of said aisleways and provided with means for rigidly securing said rub-rails in closely fitting contact with the posts or columns adjacent their lower ends on the sides facing said aisleways.*

*6. A merchandising storage rack assembly comprising: a plurality of skeleton frame members consisting of structural metallic elements, said frame members arranged in pairs when assembled for use as supporting racks, the pairs being arranged in substantially parallel rows and spaced apart at such distance as to provide an open, unobstructed aisleway therebetween for entry and unloading of a fork-lift truck or other material-handling equipment; the elements composing each individual frame member comprising one or more similarly constructed panel-like members, each including a plurality of longitudinally spaced upright supporting posts or columns rigidly secured to base plates for anchorage to a floor, the posts being connected by vertically spaced horizontal bracing members rigidly secured thereto by suitable fastening means, arm brackets rigidly secured to the posts by any suitable fastening means on the sides facing the adjacent aisleways at vertically spaced intervals and protruding outwardly over the edges of said adjacent aisleways, a plurality of load-supporting rails horizontally arranged in longitudinal relation with each row of posts and rigidly attached by fastening means to the protruding brackets; corresponding pairs of said panel-like members when constituting a frame member being juxtaposed back-to-back and rigidly secured together by spot welding or other well known fastening means, and stabilizing elements rigidly connecting the tops of the posts across adjacent aisleways.*

*7. The structure defined in claim 6, and including: rub-rails extending along the opposite sides of each aisleway and rigidly secured by fastening means to the lower portions of adjacent posts near the bottom ends thereof.*

*8. A unitary frame member for use in an assembly of one or more pairs of similarly constructed frames constituting cooperative racks for supporting and storing merchandise or agricultural products, comprising: a double row of spaced upright supporting posts in longitudinal* *alignment and the rows being in parallel, each post being* *rigidly attached to a base member having means for se-*

*curing same to a floor, each aligned row of posts braced by vertically spaced longitudinal elements rigidly attached to the successive posts of each row, and the adjacent posts of each aligned row being rigidly braced by transverse spacing members of optional length and number rigidly connected at opposite ends to the adjacent posts in each row; and a plurality of longitudinally extending members which constitute load-supporting rails which are rigidly attached to the opposite faces of at least one row of said posts by any suitable means such as horizontal arm brackets and at predetermined levels, the rails projecting horizontally outwardly from the posts to which they are attached and at a predetermined distance for receiving and supporting merchandise for storage when said frame member is arranged is cooperative parallel assembly with*

*other similar frame members on opposite sides of an aisleway.*

References Cited in the file of this patent or the original patent

UNITED STATES PATENTS

| | | |
|---|---|---|
| 750,645 | Hart | Jan. 26, 1904 |
| 753,598 | Lyon | Mar. 1, 1904 |
| 1,097,934 | Price | May 26, 1914 |
| 1,632,738 | Lord | June 14, 1927 |
| 2,690,136 | Freeman | Sept. 28, 1954 |
| 2,692,033 | Jaynes | Oct. 19, 1954 |
| 2,722,318 | Brown | Nov. 1, 1955 |
| 2,894,641 | Edwards | July 14, 1959 |